United States Patent [19]

Dempsey

[11] Patent Number: 4,946,719
[45] Date of Patent: Aug. 7, 1990

[54] DRAINABLE ARTIFICIAL TURF ASSEMBLY

[75] Inventor: Barry J. Dempsey, White Heath, Ill.

[73] Assignee: Astroturf Industries, Inc., Dalton, Ga.

[21] Appl. No.: 280,229

[22] Filed: Dec. 5, 1988

[51] Int. Cl.$^5$ .............................................. B32B 33/00
[52] U.S. Cl. ...................................... 428/17; 428/95; 428/137; 273/DIG. 13
[58] Field of Search ............................ 428/17, 95, 137; 273/DIG. 13

[56] References Cited

U.S. PATENT DOCUMENTS

| | | | |
|---|---|---|---|
| 4,405,665 | 9/1983 | Beaussier | 428/17 |
| 4,535,021 | 8/1985 | Friedrich | 428/17 |

Primary Examiner—Marion E. McCamish
Attorney, Agent, or Firm—Needle & Rosenberg

[57] ABSTRACT

An artificial turf assembly has a permeable section formed of an upper layer of artificial turf and a lower layer of shock absorbing material positioned below the upper layer. An impermeable layer is positioned below the permeable section for collecting water flowing downward through the permeable section. The permeable section is separable from the impermeable layer to form a space for the water flow away from the assembly. The space may be formed by having the permeable section lying on the impermeable layer so that it lifts off the impermeable layer and floats on the water that flows through the permeable section. Alternatively, rigid spacing members may be provided for maintaining space between the permeable and impermeable layers in the absence of water.

24 Claims, 1 Drawing Sheet

DRAINABLE ARTIFICIAL TURF ASSEMBLY

BACKGROUND OF THE INVENTION

The present invention relates to an improved artificial turf assembly and, more particularly, to a rapidly draining artificial turf assembly for a support surface, such as a playing field.

A primary consideration in the design of an artificial turf playing field is the ability of the field to rid itself of rainwater. Early fields were constructed over impervious bases and water was left to simply run off the upper turf surface. This runoff was unsightly and often interfered with play on the field. More recent fields have been designed so that water falling onto the turf surface drains through the turf assembly and into a pervious base fitted with a system of collector drains. The base typically consists of a top layer of concrete or asphalt resting on a layer of gravel throughout which the collector drains are strategically positioned. The drains collect and transport the rain water from the field. The concrete or asphalt is necessary to prevent the erosion of fine particles in the base and thereby maintain the contour of the field.

A major drawback with providing such a drainable field, particularly at the high school or community level, is the relatively high initial cost due in large part to the expense of providing the concrete or asphalt and the collector drain system. Also, the presence of the concrete or asphalt can cause the turf to retain heat and, therefore, greatly increases the temperature on the playing field during hot weather. This heat often has adverse effects on events played on such fields.

There exists a need, therefore, for an artificial turf assembly which can be used to provide a drainable playing field which can be produced relatively inexpensively.

There exists a further need for such an assembly which can be used to provide a field which does not build up excessive amounts of heat in hot weather.

SUMMARY OF THE INVENTION

The present invention provides a rapid draining artificial turf assembly which can be used on a variety of supporting surfaces, such as a playing field, which is less expensive than the above-described conventional artificial turf playing fields. This is accomplished by obviating the need for the underlying asphalt or concrete support surface, as well as the associated aggregate materials drain pipes.

The assembly comprises a permeable section formed of a conventional water permeable upper layer of artificial turf and a water permeable lower layer of shock absorbing material positioned below the upper layer. An impermeable layer, such as a plastic or rubber sheet, is positioned beneath the lower layer of shock absorbing material and collects water which drains through the permeable section. In operation (i.e.. when it rains), the permeable section and the impermeable layer are separable so that a space can be formed therebetween in which the water is collected. The permeable section may be loosely laid over the impermeable layer so that the space is created only when the permeable layer floats upon the collected water. Alternatively, rigid spacing means may be provided to maintain space between the permeable section and the impermeable layer, even in the absence of water within the space. In both cases, the water is transported away from the assembly through the space.

A permeable scrim may be positioned between the lower permeable layer and the spacing means to prevent damage to the shock absorbing material from the bottom of the lower permeable layer contacting the top of the spacing means. Also, a permeable venting layer, preferably comprised of a perforate fabric, may be positioned below the lower impermeable layer for venting vapor and/or water which might otherwise be trapped within the assembly.

When the assembly is incorporated on a playing field, it is preferred that the field be laterally sloped downwardly along its longitudinal axis to its periphery so that the collected water is drained from the field. Collecting means may be placed at the periphery of the field to collect the water that has drained through the turf assembly of the present invention.

DETAILED DESCRIPTION OF THE INVENTION

The invention relates to an artificial turf assembly which drains rapidly and which ca be constructed at low cost. The term "assembly"is used herein to refer to any area of artificial surface, such as appearing on, for example, an athletic playing field, a golf driving mat, an outdoor patio carpet, a landfill, or otherwise. The present invention is particularly useful for draining rain water from outdoor playing fields.

Figure 1:
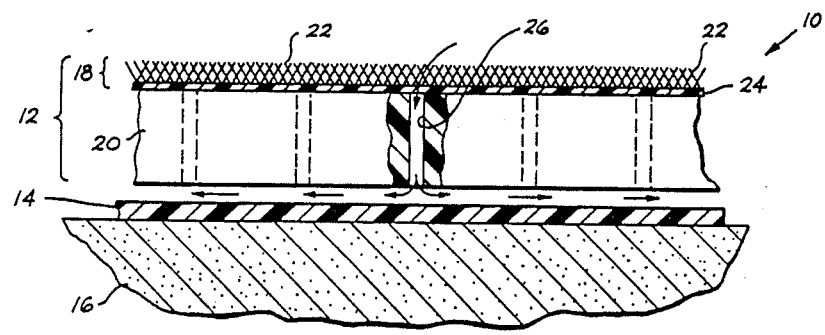
FIG. 1 is a vertical cross-sectional view of the assembly of the present invention in which the permeable layer is on the impermeable layer.

FIG. 1 illustrates a vertical cross-sectional view of a portion of an artificial turf assembly 10, such as a section of a football playing field. The assembly 10 is comprised of a permeable section 12 positioned atop an impermeable layer 14 that overlies a subgrade or other base 16.

The permeable section 12 is comprised of a water permeable upper layer of artificial turf 18 positioned atop a lower layer of shock absorbing material 20, which is also water permeable. The turf 18 may be bonded onto the top of the shock absorbing layer 20 if desired.

The construction of the artificial turf 18 is well-known and any water permeable turf 18 may be used in the practice of this invention. In general, however, it should be composed of grass-like plastic blades 22, knitted or otherwise attached to a backing sheet 24. The backing sheet 24 may be of any suitable material (i.e.. woven, felted or extruded web), so long as it is water permeable and can hold the blades 22 in stable position. Furthermore, the backing 22 may be perforated to enhance its permeability.

The layer of shock absorbing material 20 is preferably a polymeric pad. A polymeric pad particularly suitable for use in the present invention comprises a polymeric foam of an interpolymer of polyvinyl chloride and nitrile rubber having closed cells. Such pads typically should have a thickness ranging from about ¼ to 1 inch (6.3–25.4 mm). To provide adequate drainage of water, the layer of shock absorbing material 20 should have a plurality of vertical perforations 26. Useful perforations have been found to have diameters ranging from between approximately ⅛ inch (3 mm) to ½ inch (12.7 mm), although their size may be larger or smaller depending upon the needs of the final construction. The perforations 26 may be spaced as close as 2 inches (5 cm) or as far apart as 8 inches (15-20 cm) or more. Again, however, the spacing of the perforations 26 may vary depending upon the needs of the final construction. For example, more and larger perforations 26 may be required on fields located in areas of heavy rainfall. Also, it may be possible to omit the perforations entirely if the shock absorbing material is otherwise permeable.

Alternatively, the shock absorbing layer 20 may be comprised an open-celled material through which water may drain directly without the need for, or in addition to, perforations 26. Furthermore, as discussed in more detail below, it is preferable that the permeable section 12 have a specific gravity less than 1.0 so that it can float upon water. For purposes herein, the term "permeable" means capable of having fluid drain through the section 12, whether through perforations 26 or otherwise.

The impermeable layer 14 provides a barrier between the permeable section 12 and the base 16 through which water cannot pass. The impermeable layer 14 may be comprised of a sheet (or "geomembrane") of impervious material such as polyethylene, polyproplyene, polyvinyl chloride, polyester, Nylon, or rubber.

In a first embodiment shown in FIG. 1, the layer of shock absorbing material 20 is loosely laid on a sheet-like impermeable layer 14, which in turn is positioned upon a sloped base 16. Herein, the term "loosely laid" is defined as not being physically or chemically attached to the impermeable layer 14, but merely resting thereupon. When no rain falls onto the assembly, the under surface of the layer of shock absorbing material 20 is in contact with the top of the impermeable layer 14.

When it does rain, water (identified by arrows in the figures) falling on the assembly 10 passes vertically through the permeable section 12 via the perforations 26 to the impermeable layer 14, thereby providing a layer of water upon which the permeable section 12 floats. Since the base 16 is sloped, the water accumulated in the space between the section 12 and layer 14 flows along the impermeable layer 14 in a direction corresponding to the downward slope of the base 16. When the present invention is utilized on a playing field, the movement of the water through the space is also aided by the downward forces exerted by players moving about on the field.

In one particular example of the first embodiment, a layer of shock absorbing material 20 that was demonstrated to be useful had a thickness of about ⅝ inch (16 mm) with ⅜ inch (9.5 mm) perforations spaced 3 inches (7.6 cm) apart. The layer of shock absorbing material 20 had a specific gravity of about 0.12, and correspondingly had a base weight of 0.39 lbf/ft$_2$ (1.9 mm of water). Glued to the pad to form a water permeable layer 12 was a layer of artificial turf 18 comprising Nylon blades 22 knitted to a polyester backing sheet 24. The artificial turf 18 had a basis weight of 0.48 lbf/ft$_2$ (0.5 mm of water). When the permeable section 12 was floated on water, the water level rose to a height of about 3/16 inch (4.7 mm) on the ⅝ inch (16 mm) thick shock absorbing layer 20. This level was well below the level of the artificial turf 18.

Figure 2:
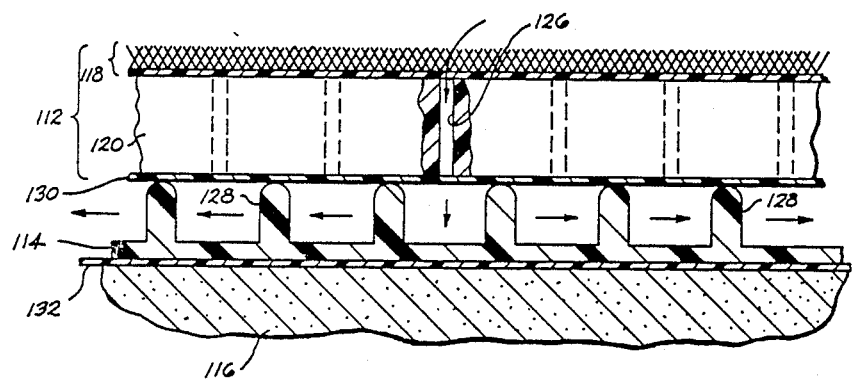
FIG. 2 is a vertical cross-sectional view of the assembly of the present invention illustrating another embodiment incorporating spacing means.

FIG. 2 illustrates a second embodiment 100 of the present invention. Permeable section 112 comprised of permeable layers 118,120; impermeable layer 114; and base 116 are identical to respective elements 12, 18, 20, 14 and 16 described above. The second embodiment 100 further includes rigid means for maintaining a space between the permeable section 112 and the impermeable layer 114. For example, the spacing means may comprise a polymeric material having a plurality of spaced posts 128 or other protrusions extending upwardly from the impermeable layer 114 and supporting thereon the permeable layer 112. Also, a criss-crossing network of polymer strand, such as a geogrid, may also be used. Channels are formed between the posts 128 for allowing the water flowing through the permeable section 112 to be directed laterally towards the opposed sides of the playing field (not shown). The posts 128 may, for instance, be integral with an extruded plastic impermeable layer 114. An advantage of using the posts 128 is that space is constantly maintained between the bottom of layer 120 and the top of impermeable layer 114, so that draining of even very small amounts of water can be obtained. The shock absorbing layer 120 may, if so desired, be adhered to the posts 128 for enhancing the stability of the assembly 110.

A scrim 130 or geotextile material may be provided between the top of the posts 128 and the bottom of the layer of shock absorbing material 120 to spread downward force evenly over the posts 128 and thereby maintain the structural integrity of the assembly 110. Herein, the term "scrim" is defined as any layer of permeable material, such as cloth or plastic mesh, which helps to prevent the posts 128 from damaging the shock absorbing layer 128.

Optionally, a venting layer 132 may be provided through which vapor and/or water rising within the base 116 may escape. The venting layer 132 is positioned between the impermeable layer 114 and the base 116, and may be a geogrid having posts similar to that described above, or a fabric, such as a venting cloth, for example, having the trademark Miraphi 140N or Amoco 4545. This permits the release of moisture which may otherwise be trapped beneath the impermeable layer 114. If desired, the venting layer 132 may be bonded or otherwise attached to the underside of the impermeable layer 114 or to the protrusions.

The assemblies 10,110 of the present invention provide numerous advantages to previously known artificial turf surfaces by eliminating the need for costly pipes and draining systems below the playing field. Water contacting the field is carried down the slope along the impermeable layer 14,114. Normally, the base 16,116 is laterally sloped, away from its center to its margins or periphery. A slope of approximately 0.5% to 3% is preferred. Therefore, water will flow to the longitudinal margins, or edges of the field where means can be provided adjacent the edges for collecting the water, such as trenches. Although portions of the field may float on the layer of water between the permeable section 12 and the impermeable layer 14, the field will remain stable if anchored at its periphery.

Another advantage of the present invention is that the impermeable section 14,114 prevents water from contacting the base 16,116. Therefore, the base 16,116 may be comprised of packed subgrade stabilized with inexpensive material such as lime, fly ash cement, bituminous material, crushed stone, or a mixture thereof, and the problem of water eroding subgrade fines (such as sand, clay, salts, etc.) and altering the contours of the field is eliminated. Alternatively, the assembly 10,110 may be placed on a "natural subgrade" in which the base 16,116 is comprised of unprepared earth, eliminating the need for an asphalt or cement base. Of course, the base 16 may comprise any adequate strong surface.

Also, the space provided between the section 12,112 and layer 14,114, as well as the venting layer 132, acts to promote circulation of air through the assembly 10. As a result, less heat will be retained on the playing field.

Furthermore, the field may be easily cleaned because rinse water will quickly run from the field. As such, the present invention has advantages even when used on indoor fields.

What is claimed is:

1. An artificial turf system, comprising:
   (a) a permeable section comprising:
      (i) a water-permeable upper layer of artificial turf, and
      (ii) a water-permeable lower layer of shock absorbing material positioned below said upper layer; and
   (b) a layer of water-impermeable material positioned below said permeable section for collecting water passing through said permeable section, said permeable section resting on said water-impermeable layer in the absence of water passing through said permeable section and whereby space is formed by water being collected between said permeable section and said water-impermeable layer so as to cause said permeable section to float on said water within said space to form a space through which said collected water can be transported away from said assembly.

2. The artificial turf system of claim 1, wherein said layer of shock absorbing material has a plurality of perforations through which water may flow.

3. The artificial turf system of claim 1, wherein said layer of shock absorbing material is an open-cell foam.

4. The artificial turf system of claim 1, wherein said water-permeable section has a specific gravity less than water.

5. The artificial turf system of claim 1, wherein said water-impermeable layer is comprised of rubber.

6. The artificial turf system of claim 1, wherein said water-impermeable layer is comprised of polymeric material.

7. The artificial turf system of claim 1, wherein said assembly is capable of being positioned on a base, and further comprising a venting layer positioned between said water-impermeable section and said base to provide means for venting water which might rise through said base.

8. The artificial turf system of claim 7, wherein said venting layer comprises a sheet of venting fabric.

9. The artificial turf system of claim 1, wherein said permeable section has a plurality of holes through which water may pass through.

10. An artificial turf playing field, comprising:
    (a) a base which laterally slopes downwardly along the longitudinal axis of said field; and
    (b) an artificial turf system positioned upon said base comprising:
       (1) a permeable section comprising:
          (i) a water-permeable upper layer of artificial turf, and
          (ii) a water-permeable lower layer of shock absorbing material positioned below said upper layer; and
       (2) a layer of water-impermeable material positioned below said permeable section for collecting water flowing through said permeable section, said permeable section resting on said water-impermeable layer in the absence of water passing through said permeable section and whereby space is formed by water being collected between said permeable section and said water-impermeable layer so as to cause said permeable section to float on said water within said space to form a space through which said collected water can be transported from said field.

11. The artificial turf system of claim 10, wherein said base is comprises of packed subgrade.

12. The artificial turf system of claim 11, wherein said subgrade is stabilized with an agent selected from the group consisting of lime, fly ash, cement, bituminous material, crushed stone, and a mixture thereof.

13. The artificial turf system of claim 10, where said permeable section has a specific gravity less than 1.0.

14. The artificial turf system of claim 10, and further comprising means adjacent the longitudinal edges of said field for collecting water flowing through said permeable section.

15. The artificial turf system of claim 10, wherein said layer of shock absorbing material has a plurality of perforations through which water may permeate.

16. The artificial turf system of claim 10, wherein said layer of shock absorbing material is an open-cell foam.

17. The artificial turf system of claim 10, wherein said water-impermeable layer is comprised of rubber.

18. The artificial turf system of claim 10, wherein said water-impermeable layer is comprised of polymeric material.

19. The artificial turf system of claim 10, wherein said is base an further comprising a venting layer positioned between said water-impermeable layer and said base to provide means for venting vapor and water which might raise vertically through said base.

20. The artificial turf system of claim 19, wherein said venting layer comprises a sheet of venting fabric.

21. The artificial turf assembly of claim 20, wherein said spaced portrusions are secured to said water-impermeable layer.

22. The artificial turf system of claim 10, wherein said base is comprised of natural subgrade.

23. The artificial turf system of claim 10, wherein said layer of shock absorbing material is a closed-cell foam.

24. The artificial turf system of claim 10, wherein said permeable section has a plurality of holes through which water may pass through.

* * * * *